United States Patent Office 3,192,191
Patented June 29, 1965

---

3,192,191
HOMOPOLYMERS AND PROCESS OF PREPARING THE SAME
Joseph R. Leto, Stamford, and Lila M. Olsen, Greenwich, Conn., assignors to American Cyanamid Company, New York, N.Y., a corporation of Maine
No Drawing. Filed Mar. 21, 1961, Ser. No. 97,165
8 Claims. (Cl. 260—93.1)

This invention relates to homopolymers of bicyclo(2,2,1)-hepta(2,5)-diene and to the process of preparing the same. More particularly, this invention relates to homopolymers of the bicyclo(2,2,1)-hepta(2,5)-diene which do not melt at temperatures up to about 350° C. at atmospheric pressure. More particularly this invention relates to a process for preparing said homopolymers by polymerizing bicyclo(2,2,1)-hepta(2,5-diene in the presence of a catalyst selected from the group consisting of bicycloheptadiene molybdenum tetracarbonyl, bicycloheptadiene tungsten tetracarbonyl, cycloheptatriene molybdenum tricarbonyl and cycloheptatriene tungsten tricarbonyl.

One of the objects of the present invention is to produce a homopolymer of bicyclo(2,2,1)-hepta(2,5)-diene which does not melt at temperatures up to about 350° C. A further object of the present invention is to produce a fibrous material from said homopolymer. These and other objects of the present invention will be discussed in greater detail hereinbelow.

In the polymerization of the bicyclo(2,2,1)-hepta(2,5)-diene one may utilize a molybdenum carbonyl or a tungsten carbonyl. More specifically these carbonyls are molybdenum hexacarbonyl and tungsten hexacarbonyl. It is theorized that these carbonyls per se do not function as catalysts in the homopolymerization of the bicyclo(2,2,1)-hepta(2,5)-diene but instead react first with said heptadiene to form a complex reaction product which has been identified as bicycloheptadiene molybdenum tetracarbonyl or bicycloheptadiene tungsten tetracarbonyl. These complex reaction products may be prepared in advance of the polymerization reaction by reacting for instance molybdenum hexacarbonyl with bicyclo(2,2,1)-hepta(2,5)-diene or these complex reaction product catalysts may be prepared in situ in the polymerization's sphere. In the preparation of the complex reaction product it is desirable for best results to use a small excess, based on stoichiometrical calculations, of the bicyclo(2,2,1)-hepta(2,5)-diene in order that substantially all of the molybdenum hexacarbonyl be converted to the complex reaction product. When the complex reaction product is prepared in situ a very substantial excess of the bicyclo(2,2,1)-hepta(2,5)-diene is utilized for two reasons. First, it is necessary to have at least a small excess present of said heptadiene in order to convert completely the hexacarbonyl into the complex reaction product and secondly, there is obviously need for substantial amounts of said heptadiene to be available for homopolymerization after the complex reaction product has been formed. The amount of the complex reaction product catalyst used in the homopolymerization of said heptadiene may be varied over fairly substantial limits such as between about 0.1 and 5.0% by weight based on the total weight of said heptadiene being polymerized. It is preferred to use between about 0.5 and 2.5% of said catalyst based on the total weight of said heptadiene.

The complex reaction product whether prepared beforehand or prepared in situ is produced in a comparatively short period of time and preferably at elevated temperatures such as about 50° C. to reflux. Once the catalytic material is prepared, the homopolymerization of said heptadiene takes considerably longer time depending upon the temperature used to carry out the polymerization reaction. The polymerization reaction itself can be carried out at any temperature varying between about room temperature, i.e., 25° C. and the reflux temperature of the system at atmospheric pressure. At the reflux temperature a period of at least about 4 hours and preferably longer such as 12 hours, 24 hours or beyond is required. At room temperature the reaction time is substantially longer such as 48 hours to 96 hours or longer. The longer the reaction time the greater the yield of homopolymer produced regardless of temperature.

In carrying out the process of the present invention one may use subatmospheric pressure or superatmospheric pressure but normal atmospheric pressures are preferred. The reaction system should be substantially free of oxygen in order to avoid any inhibition of the polymerization reaction. Still further, the system should be substantially anhydrous. Although the process of the present invention may be carried out without benefit of any solvent medium, it is preferred that an organic hydrocarbon solvent be utilized. The solvent material is of course a solvent for the bicyclo(2,2,1)-hepta(2,5)-diene but is not necessarily a solvent for the polymeric material. As a matter of fact, the homopolymers of said heptadiene are substantially insoluble in most known conventional solvent materials. Among the solvents that may be used in the practice of the process of the present invention are benzene, toluene, xylene or the aliphatic hydrocarbon solvents such as n-heptane, n-octane, n-nonane, n-decane, and the like. Additionally, one may make use of kerosene, mineral spirits and the like. These solvents may be utilized either singly or in combination with one another.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

EXAMPLE 1

Into a suitable reaction vessel equipped with thermometer, stirrer, reflux condenser and gas inlet and outlet tubes, there is introduced 1.56 parts of solid molybdenum hexacarbonyl and 54.4 parts of freshly distilled norbornadiene [bicyclo(2,2,1)hepta(2,5)-diene]. Dry, oxygen-free nitrogen is passed through the mixture for about 5 minutes while raising the temperature slowly with constant stirring. At about 50° C. the solid carbonyl is substantially completely dissolved and the liquid assumes a yellow coloration. At about 75° C. the yellow solution has increased in viscosity and begins to foam appreciably. After reflux (90° C.) is begun the solution becomes very viscous and particles of a white fibrous material are observed adhering to the reaction vessel wall and stirring blade. The temperature is held at reflux for about 16 hours at which point the solution has developed such a high viscosity that further stirring is exceedingly difficult. Thereupon a quantity of petroleum ether is added and voluminous amounts of a white or pale yellow fibrous solid precipitates. The precipitate is then isolated by filtration or centrifugation. The supernatant liquid is yellow to brown and contains unreacted monomer, molybdenum hexacarbonyl and bicycloheptadiene molybdenum tetracarbonyl. The solid precipitate is extracted in the absence of air with petroleum ether and dried in vacuo. The yield is 13.6 parts which is approximately 25% based on the monomer originally used.

*Analysis.*—Found C 89.4; H 8.8. Calculated for $(C_7H_8)_n$: C 91.2; H 8.8.

The microscopic inspection of the solid discloses long bundles of rigid fibrous materials which possess some birefringency. The exclusion of oxygen during the work-up is highly desirable in order to prevent the formation of a brown scum on the surface of the solid. This scum is believed to be an inorganic material and results from the oxidation of unremoved catalyst components. The insoluble polymer produced does not melt up to 350° C. but instead slowly turns tan and becomes brittle. The infrared spectrum of the polymer shows only absorptions arising from a saturated hydrocarbon skeleton, with no evidence of residual unsaturation in the C=C region. Evidence for the nortricycline structure arises from the appearance of infrared modes at 3.28 and 12.3µ.

EXAMPLE 2

Into a suitable reaction vessel equipped as in Example 1 there is introduced 1.56 parts of solid molybdenum hexacarbonyl, 27.2 parts of norbornadiene and 15.2 parts of toluene. The charge is treated as before except that the reflux temperature is 110° C. and the charge was held at that temperature for 21 hours. At the end of this period the solution was gel-like and further stirring was exceedingly difficult. Upon addition of the petroleum ether, a white solid precipitated and was isolated as described in Example 1. The gel-like material of the product is believed to be due, at least in part, to swelling in the toluene. The yield of the white polymeric material was 8.1 parts equivalent to about 30% based on the monomer used. It is to be noted that the use of the toluene resulted in a small increase in the yield when compared with the yield of Example 1.

EXAMPLE 3

Into a suitable reaction vessel equipped as before there is introduced 0.117 part of bicycloheptadiene molybdenum tetracarbonyl and 40.8 parts of norbornadiene. The charge was processed as before and held at reflux (91° C.) for 16 hours. Reaction solution was viscous and small fibers of polymer were observed on the walls of the reaction vessel. The work up as in Example 1 yielded 6.1 parts of polymer approximating 15% yield based on monomer.

EXAMPLE 4

Into a suitable reaction vessel equipped as before there is introduced 0.198 part of solid bicycloheptadiene molybdenum tetracarbonyl and 9.1 parts of norbornadiene. The material is mixed and held at room temperature (25° C.) under a nitrogen blanket in the dark. The yellow solution showed the onset of gelation after 2 hours and after 80 hours a thick gel or semi-solid product is obtained. The workup of this mixture as in Example 1 gives a yeild of 1.1 parts approximating 12% yield of the polymeric material based on the monomer used.

EXAMPLE 5

Example 1 is repeated in substantially all details except that a quantity of n-heptane is used as a solvent.

EXAMPLE 6

Example 1 is repeated in substantially all details except that in the place of the molybdenum hexacarbonyl there is utilized an equivalent amount of tungsten hexacarbonyl.

EXAMPLE 7

Example 4 is repeated in substantially all details except that in the place of the bicycloheptadiene molybdenum tetracarbonyl there is utilized cycloheptatriene molybdenum tricarbonyl.

EXAMPLE 8

Example 7 is repeated in substantially all details except that toluene is used as a solvent and a temperature of 85° C. is maintained.

Table.—Polymerization of bicyclo(2,2,1)-hepta(2,5)-diene

| Example No. | Solvent | Weight ratio Solvent:monomer:catalyst | Conditions, ° C./hr. | Polymer produced Wt. (g.) | Percent yield |
|---|---|---|---|---|---|
| 1 | None | 0:35 :1 | 90/16 | 13.6 | 25 |
| 2 | Toluene | 9.8:17.4:1 | 110/21 | 8.1 | 30 |
| 3 | None | 0:232 :1 | 91/16 | 6.1 | 15 |
| 4 | do | 0:46 :1 | 25/80 | 1.1 | 12 |
| 5 | n-Heptane | 7.6:17.4:1 | 100/7 | 1.4 | 5 |
| 6 | None | 0:26.2:1 | 100/22 | 4.5 | 10 |
| 7 | do | 0:58.5:1 | 25/80 | 3.0 | 11 |
| 8 | Toluene | 27.4:33.9:1 | 85/16 | 4.9 | 18 |

The results of the Examples 1–8 are set forth in the table immediately hereinbelow in which the weight ratio of monomer/catalyst and solvent, if any, reaction conditions, i.e., temperature and hours and yield in weight and percentages are set forth.

EXAMPLE 9

Exhaustive bromination of the polymer of Example 1 with $Br_2$ in carbon tetrachloride at 55° C. results in an uptake of 71% of 1 mol of bromine per $C_7H_8$ unit. The product thus produced is a light tan powder, soluble to the extent of about 1% in parabromo toluene. The infrared spectrum (in KBr) consists of CH and $CH_2$ modes in addition to a mode at 18.5µ attributed to a C—Br stretch. Other bands at 10.25 and 12.6µ are attributed to alkyl substituted cyclopropane modes in a nortricycline structure for the bromide. The brominated compound decomposes at 165° C.

EXAMPLE 10

A 5.3 part sample of homopolynorbornadiene dissolved in 40% peracetic acid at 40° C. gives a very viscous, clear liquid. The excess peracetic acid is removed with ferrous sulfate followed by fractional distillation to yield a liquid containing carbonyl and glycolic functions and which resembles the spectra obtained on authentic hydroxy acetoxy derivatives of olefinic compounds.

EXAMPLE 11

A sample of finely ground polynorbornadiene, produced according to Example 1, is placed in a button die. The die is heated to 216° C. under a pressure of 76,300 p.s.i.g. and is held under these conditions for 5 minutes. A molded button results from this treatment which has a hard, shiny appearance with a warm "feel" and a density of 1.32 g./cc. The polymer of Example 1 can therefore be molded into useful articles.

EXAMPLE 12

Into a suitable reaction vessel equipped as in Example 1 there is introduced 0.2477 part of solid molybdenum hexacarbonyl and 14 parts of freshly distilled 2-carbomethoxy bicyclo(2,2,1)-hepta(2.5)-diene and the charge was heated to 93° C. for more than 4 hours. The reaction mixture, a yellow viscous liquid, is cooled to room temperature and is poured into an excess of petroleum ether. A white precipitate is produced which is collected by centrifugation. The white solid, which is soluble in toluene, benzene, acetone, alcohols and chloroform, is crystallized from toluene, extracted with petroleum ether and dried in vacuo. The yield amounted to 4.6 parts which was equivalent to 33% yield based on monomer. The oxygen-stable solid is characterized as a homopolymer of 2-carbomethoxy bicyclo(2,2,1)-hepta(2,5)-diene by its infrared spectrum, thermal stability to 300° C. and the high viscosity of its solution in the various solvents. The nortricycline polymer structure is evidenced by infrared modes at 3.2 and 12.1μ.

We claim:

1. A process for preparing a homopolymer of bicyclo-(2,2,1)-hepta-(2,5)-diene which does not melt at temperatures up to about 350° C. at atmospheric pressure, comprising polymerizing bicyclo( 2,21)-hepta(2,5)-diene in the presence of a catalyst selected from the group consisting of bicycloheptadiene molybdenum tetracarbonyl, bicycloheptadiene tungsten tetracarbonyl, cycloheptatriene molybdenum tricarbonyl and cycloheptatriene tungsten tricarbonyl at a temperature between about 25° C. and reflux for a period of time of at least 4 hours.

2. A process for preparing a homopolymer of bicyclo-(2,2,1)-hepta(2,5)-diene which does not melt at temperatures up to about 350° C. at atmospheric pressure, comprising polymerizing bicyclo(2,2,1)-hepta(2,5)-diene in the presence of bicycloheptadiene molybdenum tetracarbonyl at a temperature between about 25° C. and reflux for a period of time of at least 4 hours.

3. A process for preparing a homopolymer of bicyclo-(2,2,1)-hepta(2,5)-diene which does not melt at temperatures up to about 350° C. at atmospheric pressure, comprising polymerizing bicyclo(2,2,1)-hepta(2,5)-diene in the presence of cycloheptatriene molybdenum tricarbonyl at a temperature between about 25° C. and reflux for a period of time of at least 4 hours.

4. A process for preparing a homopolymer of bicyclo-(2,2,1)-hepta(2,5)-diene which does not melt at temperatures up to about 350° C. at atmospheric pressure, comprising polymerizing bicyclo(2,2,1)-hepta(2,5)-diene in the pressure of cycloheptatriene tungsten tricarbonyl at a temperature between about 25° C. and reflux for a period of time of at least 4 hours.

5. A process for preparing a homopolymer of bicyclo-(2,2,1)-hepta(2,5)-diene which does not melt at temperatures up to about 350° C. at atmospheric pressure, comprising polymerizing bicyclo(2,2,1)-hepta(2,5)-diene in the presence of bicycloheptadiene tungsten tetracarbonyl at a temperature between about 25° C. and reflux for a period of time of at least 4 hours.

6. A process for preparing a homopolymer of bicyclo-(2,2,1)-hepta(2,5)-diene which does not melt at temperatures up to about 350° C. at atmospheric pressure, comprising polymerizing bicyclo(2,2,1)-hepta(2,5)-diene in the presence of a catalyst selected from the group consisting of a bicycloheptadiene molybdenum tetracarbonyl, bicycloheptadiene tungsten tetracarbonyl, cycloheptatriene molybdenum tricarbonyl and cycloheptariene tungsten tricarbonyl at a temperature between about 25° C. and reflux for a period of time of at least 4 hours in the presence of an organic hydrocarbon solvent.

7. A process for preparing a homopolymer of bicyclo-(2,2,1)-hepta(2,5)-diene which does not melt at temperatures up to about 350° C. at atmospheric pressure, comprising polymerizing bicyclo(2,2,1)-hepta(2,5)-diene in the presence of a bicycloheptadiene molybdenum tetracarbonyl at a temperature between about 25° C. and reflux for a period of time of at least 4 hours in the presence of an organic hydrocarbon solvent.

8. The product produced according to process of claim 1.

References Cited by the Examiner

UNITED STATES PATENTS

| 3,064,021 | 11/62 | Wilkenson | 260—429 |
| 3,066,123 | 11/62 | Strohmayer et al. | 260—93.1 |
| 3,093,671 | 6/63 | Ihrman et al. | 260—429 |

FOREIGN PATENTS 701,211  12/53  Great Britain.

OTHER REFERENCES

Pettit, Journal American Chemical Society, vol. 81, page 1266 (1959).

Bennett et al., "Chemical Society Journal" (page 2043 relied on, May 1961).

JOSEPH L. SCHOFER, *Primary Examiner.*

H. N. BURSTEIN, *Examiner.*

UNITED STATES PATENT OFFICE
CERTIFICATE OF CORRECTION

Patent No. 3,192,191　　　　　　　　　　　　　　　　June 29, 1965

Joseph R. Leto et al.

It is hereby certified that error appears in the above numbered patent requiring correction and that the said Letters Patent should read as corrected below.

Column 1, line 17, for "bicyclo(2,2,1)-hepta(2,5-diene" read -- bicyclo(2,2,1)-hepta-(2,5)-diene --; line 43, for "polymerization's" read -- polymerization --; column 3, line 70, for "yeild" read -- yield --; column 5, line 25, for "Aprocess" read -- A process --.

Signed and sealed this 30th day of November 1965.

(SEAL)
Attest:

ERNEST W. SWIDER　　　　　　　　　　　　　　　EDWARD J. BRENNER
Attesting Officer　　　　　　　　　　　　　　　Commissioner of Patents